US012604909B2

(12) United States Patent
Lee et al.

(10) Patent No.: US 12,604,909 B2
(45) Date of Patent: Apr. 21, 2026

(54) APPARATUS FOR SUSPENDING AND SUPPORTING CUTS OF MEAT DURING PROCESSING

(71) Applicant: DuBose Industries, Inc., Clinton, NC (US)

(72) Inventors: Richard Lee, Raleigh, NC (US); Earl DeWayne Stone, Faison, NC (US); Geng Jinghua, Langfang (CN)

(73) Assignee: DuBose Industries, Inc., Clinton, NC (US)

( * ) Notice: Subject to any disclaimer, the term of this patent is extended or adjusted under 35 U.S.C. 154(b) by 0 days.

(21) Appl. No.: 18/717,781

(22) PCT Filed: Dec. 9, 2022

(86) PCT No.: PCT/US2022/052370
§ 371 (c)(1),
(2) Date: Jun. 7, 2024

(87) PCT Pub. No.: WO2023/107681
PCT Pub. Date: Jun. 15, 2023

(65) Prior Publication Data
US 2025/0234873 A1 Jul. 24, 2025

Related U.S. Application Data

(60) Provisional application No. 63/354,475, filed on Jun. 22, 2022, provisional application No. 63/287,961, filed on Dec. 9, 2021.

(51) Int. Cl.
*A22C 15/00* (2006.01)

(52) U.S. Cl.
CPC ................................. *A22C 15/005* (2013.01)

(58) Field of Classification Search
CPC ........................... A22C 15/003; A22C 15/005
USPC ........................................................ 452/193
See application file for complete search history.

(56) References Cited

U.S. PATENT DOCUMENTS

| | | | | |
|---|---|---|---|---|
| 1,825,879 A * | 10/1931 | Louthian .............. | A22C 15/005 | |
| | | | 452/193 | |
| 2,412,233 A * | 12/1946 | Tominello ............ | A22C 15/005 | |
| | | | 99/477 | |
| 3,090,990 A * | 5/1963 | Graper ................. | A22C 15/005 | |
| | | | 452/193 | |
| 4,172,305 A * | 10/1979 | Henebry .............. | A22C 15/005 | |
| | | | 452/193 | |
| 5,938,522 A * | 8/1999 | Jagusch ............... | A22C 15/005 | |
| | | | 452/193 | |
| 6,506,108 B1 * | 1/2003 | Jagusch ............... | A22C 15/005 | |
| | | | 452/193 | |
| 7,182,686 B2 * | 2/2007 | Jagusch ............... | A22C 15/005 | |
| | | | 452/193 | |
| 7,607,973 B1 * | 10/2009 | Beld .................... | A22C 15/005 | |
| | | | 452/193 | |
| 2006/0199488 A1 * | 9/2006 | Niemiec ............... | A22B 7/002 | |
| | | | 452/187 | |

* cited by examiner

*Primary Examiner* — David J Parsley
(74) *Attorney, Agent, or Firm* — FISHERBROYLES, LLP

(57) ABSTRACT

Described herein is an apparatus for supporting cuts of meat during meat production processes, such as bacon production processes. The apparatus includes a frame, frame members, supports, and prongs affixed to the frame that are inserted into the meat cut such that the meat cut is supported by the apparatus.

22 Claims, 5 Drawing Sheets

APPARATUS FOR SUSPENDING AND SUPPORTING CUTS OF MEAT DURING PROCESSING

CROSS REFERENCE TO RELATED APPLICATIONS

This application claims priority to U.S. Provisional Application Ser. No. 63/287,961, filed Dec. 9, 2021, and U.S. Provisional Application Ser. No. 63/354,475, filed on Jun. 22, 2022, the disclosures of which are incorporated by reference as if fully set forth herein.

TECHNICAL FIELD

Solid structures for suspending and supporting meat cuts during meat processing.

BACKGROUND

Pork bellies are processed by suspending them and converting them into slabs of bacon. The pork bellies are generally placed on hangers which support the pork bellies while they are being processed.

Conventional pork belly hangers are formed with prongs mounted on a structure equipped with a hook for suspending the meat loaded hanger onto an overhead rail. Ideally operators target specific regions of the meat for prong insertion (e.g., cutaneous trunci (CT) muscle) to achieve balance, stability, and a higher-quality meat product. Insertion of the prongs into the CT muscle prevents the CT muscle from shrinking and the pork belly from elongating resulting in a lower quality product e.g., one that contains a higher fat content at the top region of the pork belly. Regions adjacent to the CT muscle have higher fat content, provide less support, and should be avoided. Therefore, insertion of the prongs into the meat requires operator precision.

Conventional hangers are prone to structural failure due, in part, to poor design features, such as weak weld joints between the prongs and base frame caused by inferior welding techniques. Weak weld joints produce a hanger that cannot support the demanding weights over time and/or sustain operator hanger mistreatment due to the fast-paced production line environment. Moreover, some conventional hanger designs tend to damage the pork belly due to imprecise prong Insertion, a factor contributed to by poor hanger design or regular structural failure. Furthermore, once the hanger is inserted into the meat, the worker is expected to lift the hanger and attached meat product onto an overhead rail—a repeated task that requires strength and stamina. A hanger that has improved strength and durability, requires lower manufacturing time and cost, has a simpler design with less parts to assemble, has improved storability, is more convenient for the worker to pick up from a stored position, and improves worker insertion precision is desired.

SUMMARY

Various embodiments of the apparatus for suspending and supporting cuts of meat during processing are disclosed herein. In some embodiments, the apparatus comprises a frame and a plurality of prong units affixed to said frame for insertion into a target region of the cut. In one embodiment, the frame can comprise a first frame member and a second frame member.

The first frame member can contain a one-piece substantially rectangular support. In some embodiments, the rectangular support can contain an upper bar, a lower bar, a first side bar, and a second side bar. In one embodiment, the upper bar and lower bar are parallel. In another embodiment, the two side bars are parallel. In some embodiments, the term "parallel" means "substantially parallel" or "approximately parallel." In said embodiments, there is no requirement for the bars to be precisely parallel.

In another embodiment, the second frame member can be a u-shaped support. The u-shaped support can be centered along a central vertical axis on said lower bar of the first frame member. In one embodiment, the u-shaped support can contain a lower bar, a first side bar and a second side bar. In some embodiments, the first side bar and second side bar of the u-shaped support can bend substantially (or approximately) 90 degrees outward to form a first attachment element and a second attachment element which is used to attach the second frame member to the first frame member. In some embodiments, the contact points at which said second frame member is affixed to said lower bar of the first frame member form at least one junction. In one embodiment, the junction is a laser weld joint.

In another embodiment, the plurality of prong units affixed to said frame can be the same size, can contain at least two arms with terminal points, and a support bar adjoining said at least two arms. The terminal points can be distal from the support bar and contain sharpened distal tips for efficient impalement of meat cuts. The two arms of each prong can be set at an angle relative to the support bar. In one embodiment, the two arms extend upward i.e., in the general direction of the upper bar of the first frame member, which is above the lower bar upon which the support bar is affixed. The arms of each prong unit are substantially parallel to one another i.e., they all must be set at the same angle relative to the support bar.

In some embodiments, the first frame member comprises three or more prong units affixed to said lower bar of the first frame member. In one embodiment, the first frame member comprises four prong units. In another embodiment, the second frame member comprises one or more prongs affixed to said lower bar of the second frame member. In one embodiment, the second frame member comprises two prong units. In some embodiments, the support bar of the prong units is affixed to said lower bar of the first and second frame members. In some embodiments, the contact points at which said prongs are affixed to said bars on respective frame members form junction(s). In one embodiment, the junctions are laser weld joints. In another embodiment, the prong units on said second frame member and said first frame member do not align on the vertical axis i.e., they are staggered, such that (for example) a prong on the second frame member is centrally positioned between two prongs on the first frame member.

In another embodiment, the first frame member can comprise a first double prong unit, a second double prong unit, a first single prong unit, and a second single prong unit. A double prong unit comprises two arms, an interior and exterior arm, affixed to the lower bar of the first frame member by said support bar. A single prong unit comprises one arm, an exterior arm, affixed to the lower bar of the first frame member by a support bar. In this embodiment, in essence, the interior arms of the single prong units are missing. In some embodiments, the first and second single prong units can be positioned between (and interior to along the lower bar) the first and second double prong. In this embodiment, the support bars of each single prong unit extend diagonally upward (approximately 45 degrees) in opposite directions from the vacant interior arm positions to the upper bar and then laterally parallel to the upper bar (lateral portion) where they meet to form a transverse brace or support spanning between the upper and lower bar. The transverse brace is affixed to the upper bar at the contact point between the lateral portion and the upper bar. In some embodiments, the contact points at which said lateral portion of said transverse brace are affixed to said upper bar of the first frame member form at least one junction. In one embodiment, the junction is a laser weld joint.

In another embodiment, the first and second frame members can include a plurality of vertical supports that may be spaced apart an equal distance from one another. In some embodiments, vertical supports can be attached to said upper bar and said lower bar of the first frame member spanning the space between said upper bar and lower bar. Vertical supports also can be attached to said lower bar of the second frame member and the lower bar of the first frame member spanning the space between said lower bars. The points of vertical support attachment can form junctions, which in some embodiments comprise laser weld joints.

In another embodiment, a substantially s-shaped hook can be affixed to the frame. The s-shaped hook can be affixed to said upper bar of the first frame member forming at least one junction therebetween, which in some embodiments, comprises a laser weld joint. The hook can include a top curved portion, a bottom curved portion, an upper mid-section and a lower mid-section and terminate in a horizontally oriented attachment element. In one embodiment, the laser weld joint is between the attachment element and the upper bar of the first frame member.

In another embodiment, a lateral hand grip can be affixed to the frame. The lateral hand grip can be affixed at one end to an upper mid-section of the s-shaped hook and at another end to the upper bar of said first frame member forming e.g., laser weld joints, at both ends. A lateral brace, in some embodiments, extending in the opposite direction of said lateral hand grip can be affixed to the frame. The lateral brace can be attached at two points e.g., to said lower mid-section of said s-shaped hook and said upper bar of the first frame member forming junctions (e.g., laser weld joints) at each point of attachment.

BRIEF DESCRIPTION OF THE FIGURES

Having thus described the presently disclosed subject matter in general terms, reference now will be made to the accompanying Figures which disclose representative embodiments of the invention.

Figure 1:
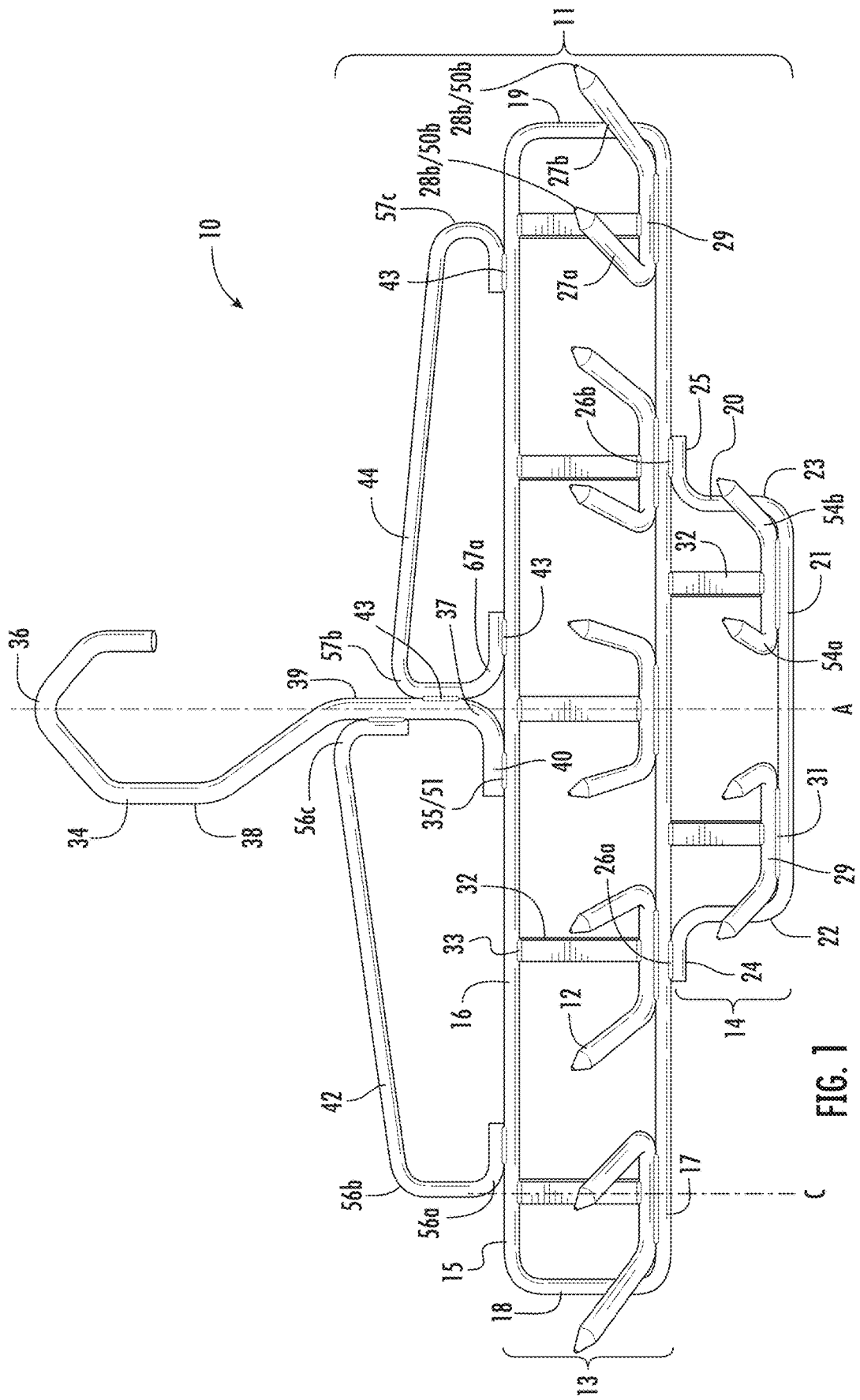

FIG. 1 depicts a front perspective of an embodiment with five upper double prong units and two lower double prong units staggered between upper double prong units 2 and 3 and 3 and 4.

Figure 2:
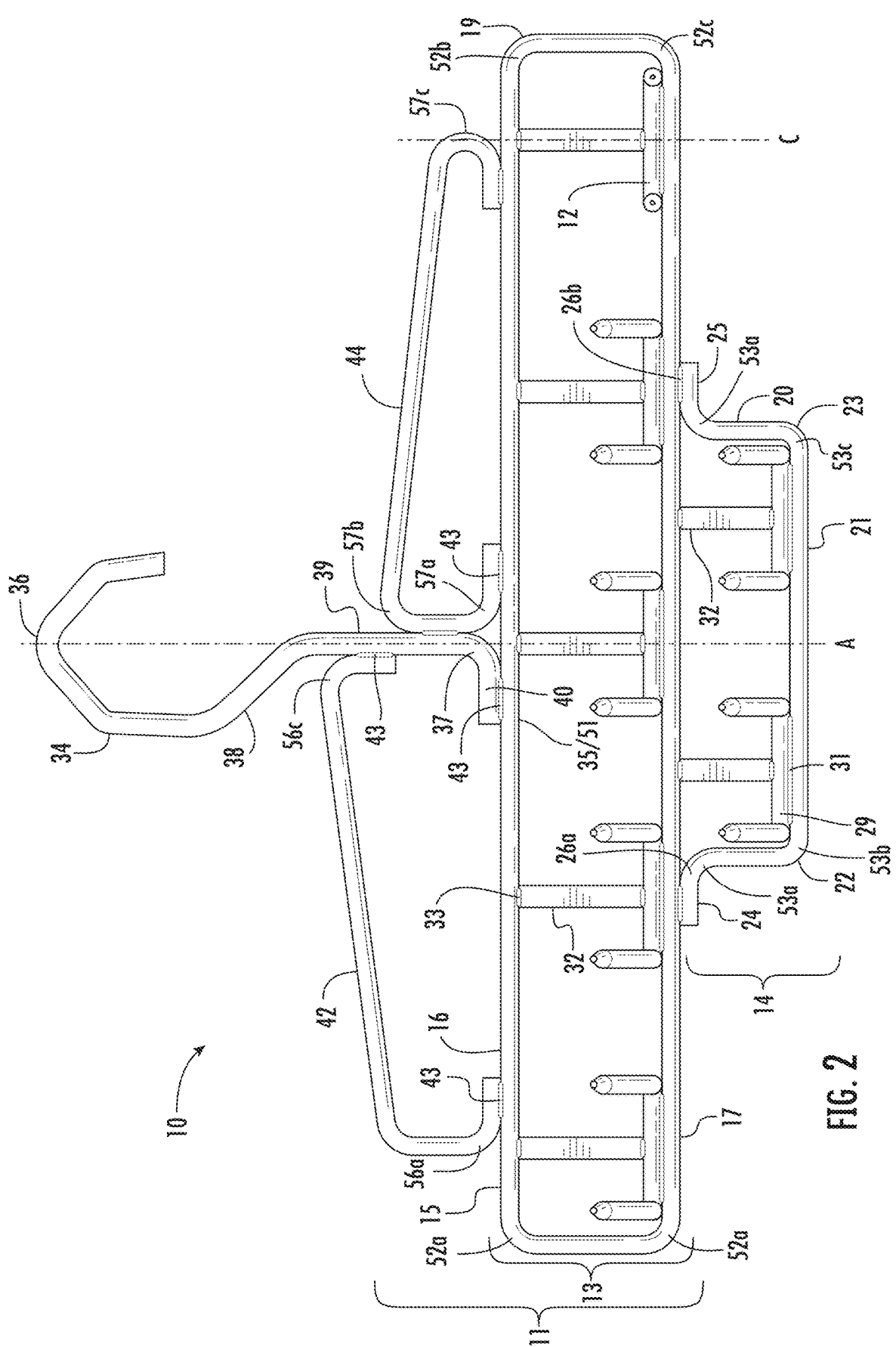

FIG. 2 depicts a front plane view of the embodiment shown in FIG. 1.

Figure 3:
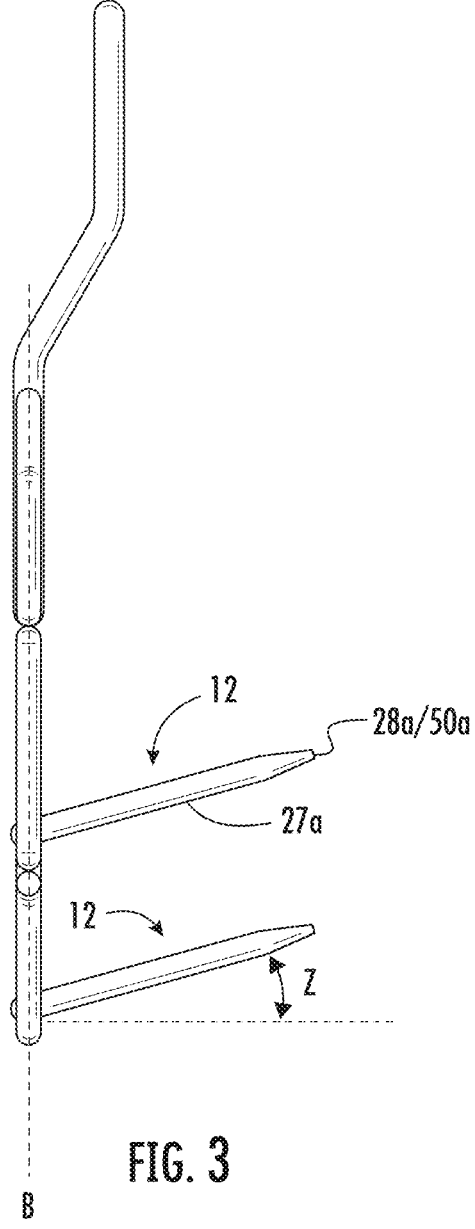

FIG. 3 depicts a side view of the embodiment shown in FIG. 1.

Figure 4:
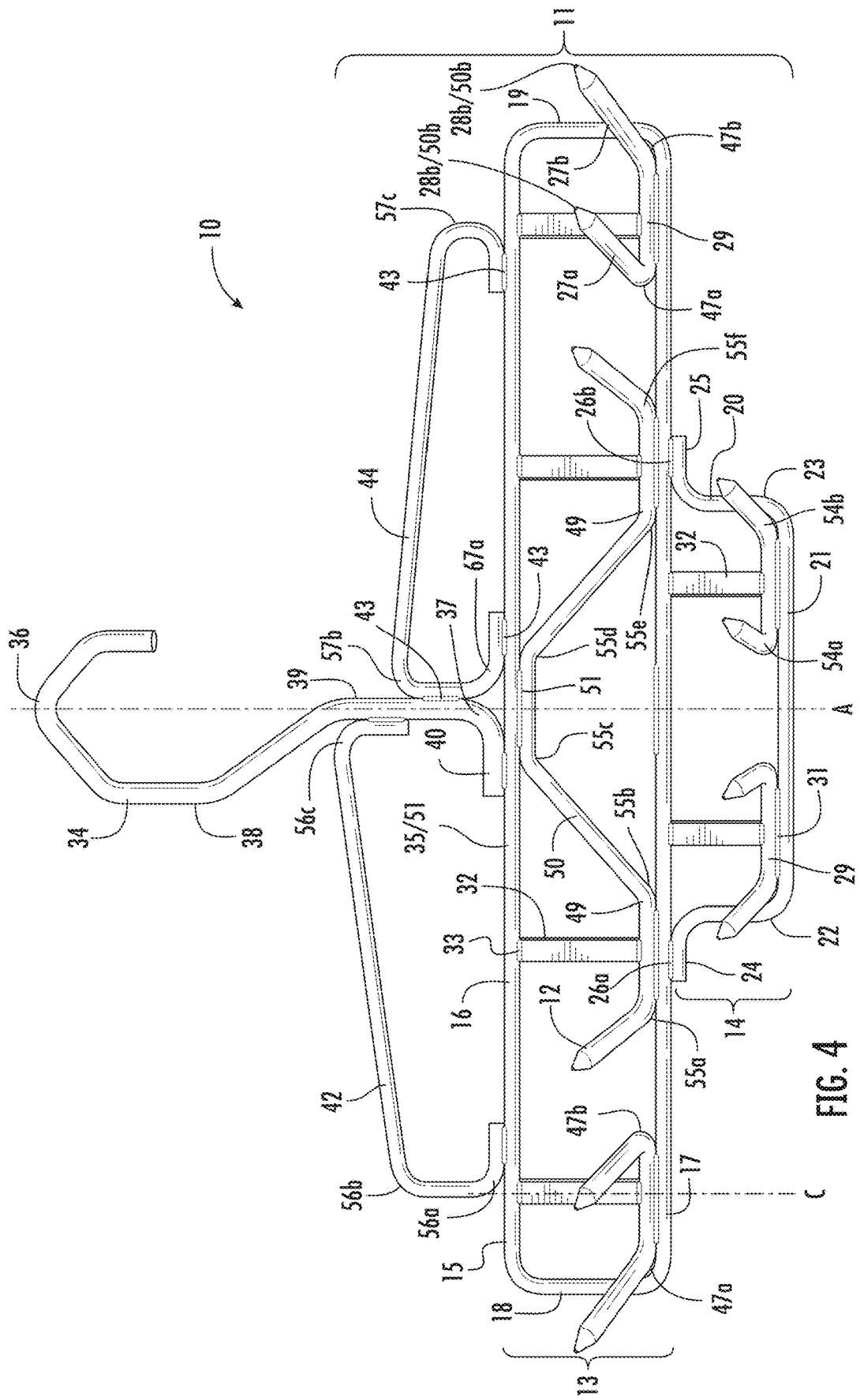

FIG. 4 depicts a front perspective of an embodiment with four upper prong units (two single prong units and two double prong units flanking the single prong units) and two lower double prong units.

Figure 5:
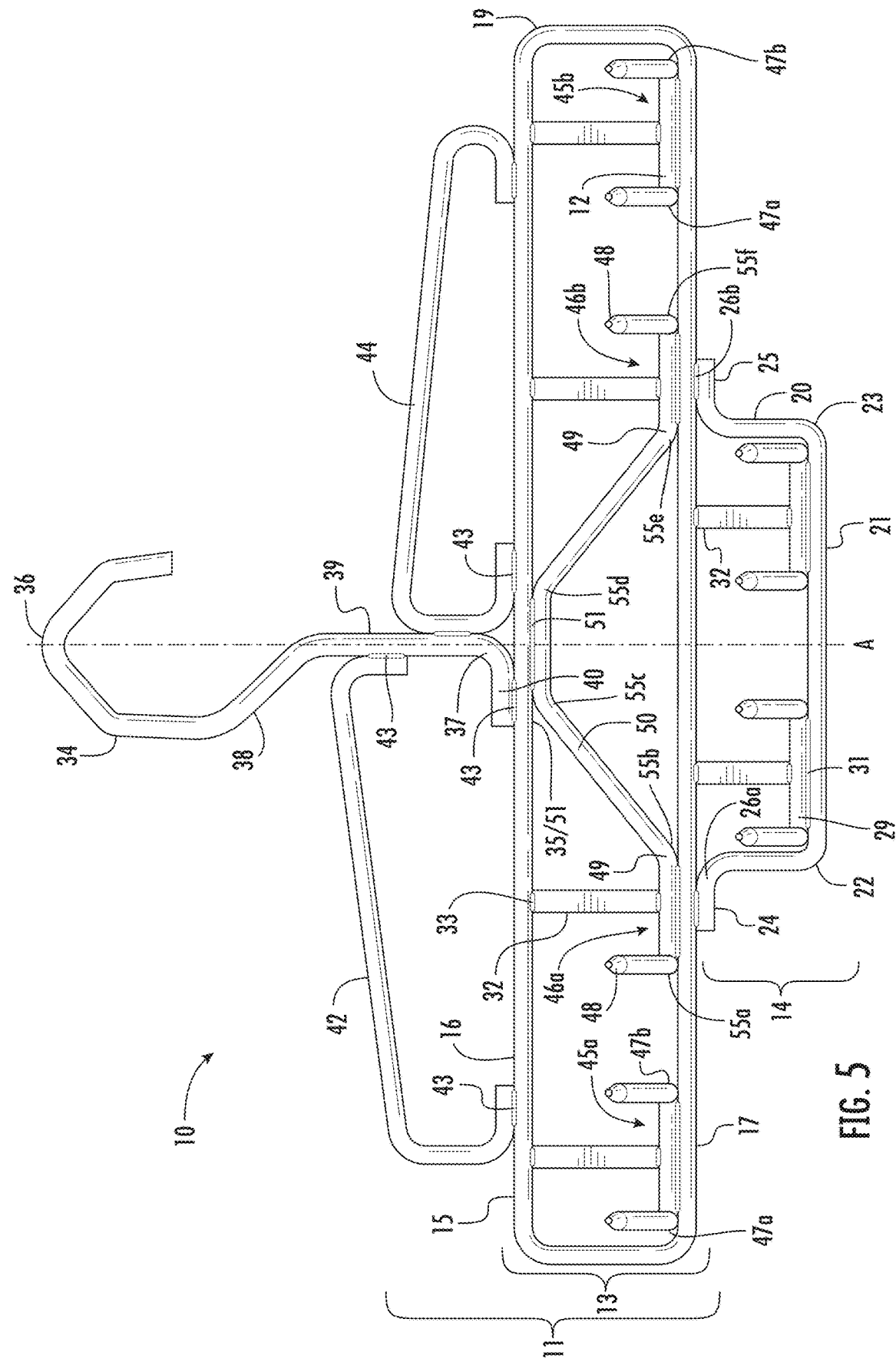

FIG. 5 depicts a front plane view of the embodiment shown in FIG. 4.

DETAILED DESCRIPTION

A Detailed Description is provided below with reference to the figures. This application incorporates by reference U.S. Provisional Application Ser. Nos. 63/287,961 and 63/354,475 in their entirety. Described herein is an apparatus for supporting cuts of meat during processing. To the extent the apparatus is designed to be hung or suspended on a bar, rail, or other support, it can be referred to as a hanger. Referring to FIGS. 1 and 2A, the apparatus or hanger 10 comprises a frame 11 and a plurality of prong units 12 (reference number 12 points to one of the plurality of prong units as an example) affixed to said frame for insertion into a target region of the cut. In this embodiment, a prong unit comprises two arms. The overall frame 11 can include a first frame member 13 and a second frame member 14. In the embodiment shown in FIGS. 1 and 2, the first frame member 13 is positioned above the second frame member 14. Also, second frame member 14 has a smaller profile than first frame member 13.

It should be noted that terms such as "above", "below", "top", "bottom", "left" "right" "upper", "lower", and the like are not intended to limit the invention to a specific orientation of the various structural components described herein and are to be considered as examples. Further, the figures represent embodiments of various feature(s) and, likewise, are not limiting.

The term "welding" is intended to mean a fabrication process that joins materials, usually metals or thermoplastics, by using high heat to melt the parts together and allowing them to cool, causing fusion. Welding techniques include, for example, arc welding techniques, such as TIG (Tungsten Inert Gas), stick welding, MIG (Metal Inert Gas), and flux core arc, plasma arc, electron beam, and atomic hydrogen. Alternative techniques include "laser welding" which is intended to mean a process used to join together materials, such as metals, using a laser beam to form a weld.

As illustrated in FIGS. 1-3, the first frame member 13 can be a one-piece substantially rectangular support 15. The rectangular support 15 can be a one-piece metal rod (or bar) with four substantially rounded corners 52a-d. The rectangular support 15 can include an upper rod 16, a lower rod 17, a first side rod 18, and a second side rod 19. FIG. 1 shows a substantially parallel upper rod 16 and lower rod 17 as well as a substantially parallel first side rod 18 and second side rod 19. Second frame member 14 is depicted as a u-shaped support 20. The u-shaped support 20 can also be a one-piece metal rod (or bar) with four substantially rounded corners 53a-d. As shown in FIG. 1, second frame member 14 can be centered along a central vertical axis (A) extending through said lower rod 17 of the first frame member 13. The u-shaped support 20 contains a lower rod 21, a first side rod 22 and a second side rod 23. The first side rod 22 and second side rod 23 of the u-shaped support 20 bends substantially (or approximately) 90 degrees outward at rounded corners 53b and 53d to form a first attachment region 24 and a second attachment region 25 which are used to attach the second frame member 14 to the first frame member 13. The contact or attachment points at which said second frame member 14 is affixed to said lower rod 17 of the first frame member 13 form bonded junctions 26a and 26b. Examples of suitable materials for the rectangular support 15 and u-shaped support 20 include stainless steel, alloy steel, carbon steel, galvanized low carbon steel, titanium alloys, and the like.

In one embodiment, the bonded junctions 26a and 26b can be formed via welding process as shown in FIGS. 1-2. In one embodiment, laser welding is used to form laser weld joints. Generally, laser welding operates in two modes: heat conduction or keyhole welding. The mode largely depends on the power density across the beam hitting the workpiece.

With heat conduction welding, the metal surface can be heated past its melting point, but not so much that it begins to vaporize. The laser beam can be absorbed at the material surface e.g., does not penetrate into the material. With keyhole welding, the laser beam power density is greater (e.g., 105 W/mm² (greater than 106-107 W/mm²) and the contact surface is typically heated to the point of vaporization. The beam penetrates into the workpiece forming a cavity called a keyhole filled with metal vapor (which in some cases can be ionized, forming a plasma). Laser welding offers accurate and precise targeting, can be automated, can be performed at high welding speeds, and produces a very strong bond. In one embodiment, heat conduction welding can be used. In an alternative embodiment, keyhole welding is used. As shown in the FIGS. 1, 2A, and 3, bonded junctions 26a and 26b lie between attachment regions 24 and 25 of u-shaped support 20 and lower bar 17 of first frame member 13 and forming an exceptionally strong bond between the two structural components.

Referring to the embodiment shown in FIG. 1, the plurality of prong units 12 affixed to said frame 11 are the same size and shape. As shown in FIG. 1, the prong units can contain two arms 27a and 27b with terminal points 28a and 28b ("double prong units"), and a support rod 29 adjoining said at least two arms. In some embodiments, the prong unit 12 can be a one-piece metal rod (or bar) with two substantially rounded corners 54a-b. The terminal points 28a and 28b are shown to be distal from the support rod 29 and contain sharpened distal tips 30a and 30b for efficient insertion into meat cuts. The two arms 27a and 27b of each prong unit can be set at an angle relative to the support bar. The angle is designated with the letter Z in FIG. 3. In the embodiment shown in FIG. 3, the two arms 27a and 27b are biased upward i.e., in the general direction of the upper rod 16 of the first frame member, which is above the lower rod 17 upon which the support rod 29 is affixed on the first frame member. The arms 27a and 27b of each prong are substantially parallel to one another i.e., they are set at the same angle relative to the support rod 29.

As illustrated in the embodiment shown in FIG. 1, the first frame member 13 contains three or more prong units 12 (five prong units in this embodiment) affixed to the lower rod 17 of the first frame member 13. The second frame member 14 contains one or more prong units 12 (two prongs in this embodiment) affixed to the lower rod 21 of the second frame member 14. As shown in the figure, the support rod 29 of the one or more prong units 12 is affixed to the lower rod 21 of the second frame member 14. With continued reference to FIG. 1, the contact points at which said prong units 12 are affixed to said rods on respective frame members form junction(s) 31. In one embodiment, laser welding is used and the junctions 31 are laser weld joints produced by laser welding. In the embodiment shown in FIGS. 1-2, prong units 12 on said second frame member 14 and said first frame member 13 do not align along the vertical axis i.e., they are staggered, such that (for example) a prong 12a on the second frame member 14 is centrally positioned between two prongs 12b and 12c on the first frame member 13.

Referring now the embodiment illustrated in FIGS. 4-5, the first frame member 13 can comprise a first double prong unit 45a, a second double prong unit 45b, a first single prong unit 46a, and a second single prong unit 46b. A double prong unit comprises two arms (an interior arm 47a and an exterior arm 47b) adjoined and affixed to the lower bar 17 of the first frame member 13 by said support bar 29. In some embodiments, the single and double prong units can be a one-piece metal rod (or bar). As with previous embodiments, the double prong unit 45a-b can contain two substantially rounded corners 54a-b. A single prong unit comprises one arm (an exterior arm 48), affixed to the lower rod 17 of the first frame member 13 by a support rod 29. In this embodiment, in essence, the interior arms of the single prong units are omitted leaving a vacant interior arm position 49a-b. In some embodiments, the first and second single prong units (46a-b) can be positioned between (and interior to along the lower rod 17) the first and second double prong units 45a-b. In this embodiment, the support rods 29 of each single prong unit extend diagonally upward (approximately 45 degrees) in opposite directions from the vacant interior arm positions 49a-b to the upper rod 16 and then laterally parallel to the upper rod (lateral portion) where they meet to form a transverse brace or support 50 spanning between the upper 16 and lower bar 17. The transverse brace 50 is affixed to the upper rod at the contact point between the lateral portion and the upper rod. In some embodiments, the contact points at which said lateral portion of said transverse brace are affixed to said upper rod of the first frame member form at least one junction 51. In one embodiment, the junction is a laser weld joint. In some embodiments, the transverse brace 50 and single prong units 46a-b can be formed together from a single metal rod (or bar) with six substantially rounded corners 55a-f.

Also shown in FIGS. 1-2 and 4-5, first and second frame members (13 and 14) can include a plurality of vertical supports 32 spaced apart an equal distance from one another. Vertical supports 32 can be attached to the upper rod 16 and said lower rod 17 of the first frame member 13 spanning the space between the upper rod and lower rod. Vertical supports 32 also can be attached to said lower rod 21 of the second frame member 14 and the lower rod 17 of the first frame member 13 spanning the space between said lower bars. The points of vertical support attachment can form junctions 33, which, in some embodiments, are laser weld joints for enhanced strength. In one embodiment, the vertical support 29 is attached at two points forming two junctions 33a-b. In some embodiments, the vertical supports 29 are attached to the support rod 29 of prong units.

As illustrated in FIG. 1, vertical supports 32 can be positioned along a vertical axis (C) extending through the center point of support rods 29. Positioning the vertical supports 32 along axis (C) counters the substantial forces exerted on the prong units by the hanging meat product and violent twists and turns along the production line. In some embodiments, the vertical supports 32 are a substantially flat metal bar as depicted in FIG. 1.

A substantially s-shaped hook 34 is also shown affixed to the frame in FIGS. 1-5. The s-shaped hook 34 can be affixed to said upper bar 16 of the first frame member 13 forming at least one junction 35 therebetween, which in some embodiments, comprises a laser weld joint. As depicted (in this embodiment, formed from a single metal rod), the hook 34 can include a top curved portion 36, a bottom curved portion 37, an upper mid-section 38 and a lower mid-section 39 and terminate in a horizontally oriented attachment element 40. In one embodiment, a weld joint 41 is between the attachment element 40 and the upper bar 16 of the first frame member 13. In some embodiments, the weld joint is a laser weld joint formed via laser welding. In another embodiment, the laser welding technique is keyhole welding or heat conduction welding.

Also included in the embodiment shown in FIGS. 1-5, is a lateral hand grip 42 (in this embodiment, formed from a single metal rod) affixed to the frame 11. The lateral hand grip 42 can be affixed at one end to the upper mid-section 38 of the hook 34 and at another end to the upper bar 16 of said first frame member 13 forming junctions 43 (e.g., laser weld joints), at both ends. The lateral hand grip 42 shown in FIG. 1 can include three (3) rounded corners 56*a-c*. A lateral brace 44 (in this embodiment, formed from a single metal rod) is also shown in the figures affixed to the frame 11 and extending in the opposite direction of said lateral hand grip 42. The lateral brace 44 can be attached at two points e.g., to said lower mid-section of said s-shaped hook and said upper bar of the first frame member forming junctions (e.g., laser weld joints) at each point of attachment. The lateral brace 44 shown in FIG. 1 can include three (3) rounded corners 57*a-c*.

As explained above, the structural elements of apparatus 10, as illustrated in the figures, can be made from a plurality of metal rods of suitable gauge and length that are bent as shown and joined or connected by welding or other suitable method. In the embodiment illustrated in FIGS. 1-3, the assembled hanger comprises twelve (12) metal rods and seven (7) vertical supports 32. In the embodiment illustrated in FIGS. 4-5, the assembled hanger comprises ten (10) metal rods and six (6) vertical supports 32. Assembly processes using laser welding techniques unexpectedly improved hanger structural strength and durability. Moreover, the implementation of laser welding reduced manufacturing time and costs another unexpected benefit.

Referring to the embodiments shown in FIGS. 1 and 4, it should be noted that at least the primary support structures 13 and 14 (that support prong units which bear most of the meat product weight), the lateral hand grip 42, lateral brace 44, and the transverse brace 50 are aligned along plane (B) (shown in FIG. 3) and are, therefore, co-planar. Moreover, in some embodiments, the support rods 29 of prong units can also be aligned (co-planar) with the structural components described above, such that only arms 27*a-b* extend outside plane (B). Alignment of these structural components on a common plane (B) reduces the hanger profile and improves hanger balance, user handling, storage and stacking, resistance to damage caused by accidental floor drops due to fewer exposed structures, and manufacturing efficiency. Such a design improves meat insertion precision of operators under stress resulting in higher quality meat products.

Embodiments of the invention are described in the numbered paragraphs below.

1. An apparatus for supporting cuts of meat during processing comprising:
   a frame comprising a first frame member and a second frame member;
   wherein said first frame member comprises a one-piece substantially rectangular support comprising an upper bar, a lower bar, a first side bar, and a second side bar, wherein said upper bar and said lower bar are parallel and said first side bar and said second side bar are parallel;
   wherein said second frame member comprises a u-shaped support comprising a lower bar, a first side bar, a second side bar, wherein said first side bar and said second side bar of the u-shaped support bend substantially 90 degrees outward to form a first attachment element and a second attachment element,
   wherein the second frame member is affixed to said lower bar of the first frame member forming a plurality of junctions, and
   a plurality of prong units affixed to said frame comprising at least two arms comprising terminal points, and a support bar adjoining said at least two arms, wherein said first frame member comprises three or more prong units affixed to said lower bar of the first frame member and said second frame member comprises one or more prong units affixed to said lower bar of the second frame member.

2. The apparatus of paragraph 1 wherein said three or more prong units are affixed to said lower bar of the first frame member forming at least one junction therebetween.

3. The apparatus of paragraph 1 wherein said one or more prong units are affixed to said lower bar of said second frame member forming at least one junction therebetween.

4. The apparatus of any one of paragraphs 2 or 3, wherein said at least one junction comprises a laser weld joint.

5. The apparatus of paragraph 1 wherein said three or more prong units affixed to said lower bar of the first frame member and said one or more prong units affixed to said lower bar of the second frame member are staggered such that they do not align vertically.

6. The apparatus of paragraph 1 wherein the u-shaped support is centered on said lower bar of the first frame member.

7. The apparatus of paragraph 4 wherein said at least one junction is formed between said support bar and said lower bars of the first and second frame members.

8. The apparatus of paragraph 1 wherein said plurality of junctions are formed between said first and second attachment elements and said lower bar of the first frame member.

9. The apparatus of paragraph 8 wherein said plurality of junctions comprise laser weld joints.

10. The apparatus of paragraph 9 wherein said first and second frame members further comprise a plurality of vertical supports.

11. The apparatus of paragraph 10 wherein said plurality of vertical supports are spaced apart an equal distance from one another.

12. The apparatus of paragraph 11 wherein said plurality of vertical supports on said first frame member are attached to said upper bar and said lower bar forming a junction at each point of attachment.

13. The apparatus of paragraph 12 wherein said each junction comprises a laser weld joint.

14. The apparatus of paragraph 11 wherein said plurality of vertical supports on said second frame member are attached to said lower bar of said first frame member and said lower bar of said second frame member forming a junction at each point of attachment.

15. The apparatus of paragraph 14 wherein said each junction comprises a laser weld joint.

16, The apparatus of any one of paragraph 10 through paragraph 15, wherein each of said plurality of vertical supports is aligned with a vertical axis (C).

18. The apparatus of paragraph 1 further comprising a substantially s-shaped hook comprising a top curved portion and a bottom curved portion terminating in a horizontally oriented flat attachment element, 19. The apparatus of paragraph 17 wherein s-shaped hook is affixed to said upper bar of the first frame member forming at least one junction therebetween.

20. The apparatus of paragraph 18 wherein said at least one junction comprises a laser weld.

21. The apparatus of paragraph 19 wherein said laser weld is between the attachment member and the upper bar of the first frame member.

22. The apparatus of paragraph 17 further comprising a lateral hand grip affixed at one end to an upper mid-section of said s-shaped hook and at another end to said upper bar of said first frame member forming junctions at both ends.

23. The apparatus of paragraph 21 wherein said junctions comprise laser welds.

24. The apparatus of paragraph 21 further comprising a lateral brace extending in the opposite direction of said lateral hand grip and attached at two points to said lower mid-section of said s-shaped hook and said upper bar of the first frame member forming junctions at each point of attachment.

25. The apparatus of paragraph 23 wherein said junctions comprise laser welds.

26. The apparatus of any one of paragraphs 1, 21, or 23, wherein said first frame member, said second frame member, said lateral hand grip, and said lateral brace are co-planar.

27. The apparatus of any one of paragraphs 1, 17, 21, or 23 wherein said first frame member, said second frame member, said lateral hand grip, said lateral brace, said s-shaped hook, and said plurality of prong units are single piece stainless steel rods.

28. An apparatus for supporting cuts of meat during processing comprising:
a frame comprising a first frame member and a second frame member;
wherein said first frame member comprises a one-piece substantially rectangular support comprising an upper bar, a lower bar, a first side bar, and a second side bar, wherein said upper bar and said lower bar are parallel and said first side bar and said second side bar are parallel;
wherein said second frame member comprises a u-shaped support comprising a lower bar, a first side bar, a second side bar, wherein said first side bar and said second side bar of the u-shaped support bend substantially 90 degrees outward to form a first attachment element and a second attachment element,
wherein the second frame member is affixed to said lower bar of the first frame member forming a plurality of junctions, and
a plurality of prong units affixed to said frame comprising at least one arm comprising a terminal point, and a support bar,
wherein said first frame member comprises a first double prong unit, a second double prong unit, a first single prong unit, and a second single prong unit affixed to said lower bar of the first frame member and said second frame member comprises a first double prong unit and a second double prong unit affixed to said lower bar of the second frame member.

29. The apparatus of paragraph 27 further comprising a transverse brace formed from said support bars of said first and second single prong units.

30. The apparatus of paragraph 28 wherein said transverse brace comprises two diagonal supports extending from the support bars to the upper bar of the first frame member.

31. The apparatus of paragraph 28 wherein said transverse brace comprises a lateral support parallel to the upper bar of the first frame member.

32. The apparatus of paragraph 28 wherein the angle of the diagonal supports are offset 45 degrees from the plane of the lower bar of the first frame member.

While the invention has been described with reference to embodiments contained in the figures, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, the invention is not intended to be limited to the particular embodiments disclosed, but that the invention will include all embodiments falling within the scope of the appended claims.

What is claimed is:

1. An apparatus for supporting cuts of meat during processing comprising:
a frame comprising
a first frame member comprising a one-piece substantially rectangular support comprising an upper bar, a lower bar, a first side bar, and a second side bar, wherein said upper bar and said lower bar are parallel and said first side bar and said second side bar are parallel; and
a second frame member comprising a u-shaped support comprising a lower bar, a first side bar, a second side bar, wherein said first side bar and said second side bar of the u-shaped support bend substantially 90 degrees outward to form a first side bar extension at a first end of the u-shaped support and a second side bar extension at a second end of the u-shaped support, each side bar extension extending in opposite directions and each positioned parallel to and beneath a bottom surface of said lower bar of said first frame member,
wherein said substantially rectangular support is positioned above and vertically co-planar with said u-shaped support,
wherein a top surface of said first and second side bar extensions are affixed to said bottom surface of said lower bar of the first frame member forming a plurality of junctions securing said second frame member to said first frame member,
and
a plurality of prong units, each prong unit comprising at least two arms the entirety of which extend outward and at an acute angle to the vertical plane of said substantially rectangular support and said u-shaped support comprising terminal points, and a support bar spanning between and adjoining said at least two arms, wherein a set of three or more prong units are affixed to said lower bar of the first frame member and a set of one or more prong units are affixed to said lower bar of the second frame member.

2. The apparatus of claim 1, wherein said support bar of each of said plurality of prong units comprises a bottom surface, wherein said bottom surface of said support bar of each of said plurality of prong units is affixed to a top surface of said lower bar of the first frame member or a top surface of said lower bar of the second frame member forming a junction between each support bar and the lower bar to which it is affixed.

3. The apparatus of claim 2, wherein said junction comprises a laser weld joint.

4. The apparatus of claim 1, wherein each of said three or more prong units are vertically offset with each of said one or more prong units.

5. The apparatus of claim 1, wherein the u-shaped support is centered on said lower bar of the first frame member.

6. The apparatus of claim 1, wherein said plurality of junctions comprise a first junction formed between said top surface of said first side bar extension and said bottom surface of said lower bar of said first frame member, and a second junction formed between said top surface of said second side bar extension and said bottom surface of said lower bar of said first frame member; wherein said first and second junctions comprise laser weld joints.

7. The apparatus of claim 6, wherein said first frame member comprises a first set of vertical supports spanning between said upper bar and said lower bar of said first frame member and said second frame member comprises a second set of plurality of vertical supports spanning between said lower bar of said second frame member and said lower bar of said first frame member.

8. The apparatus of claim 7, wherein said first set of vertical supports attached to said upper bar and said lower bar of said first frame member form a junction at each point of attachment comprising a laser weld joint.

9. The apparatus of claim 8, wherein said second set of vertical supports attached to said lower bar of said first frame member and said lower bar of said second frame member form a junction at each point of attachment comprising a laser weld joint.

10. The apparatus of claim 7, wherein each of said vertical supports intersect a center point of each prong unit support bar and are substantially perpendicular to said support bar.

11. The apparatus of claim 1, further comprising a substantially s-shaped hook comprising a top curved portion and a bottom curved portion terminating in a horizontally oriented attachment element.

12. The apparatus of claim 11, wherein said s-shaped hook is affixed to a top surface of said upper bar of the first frame member forming at least one junction therebetween and wherein said at least one junction comprises a laser weld joint.

13. The apparatus of claim 12, wherein said laser weld is between a bottom surface of the horizontally oriented attachment element and the top surface of said upper bar of the first frame member.

14. The apparatus of claim 13, further comprising a lateral hand grip flanking and extending from a first lateral surface of said s-shaped hook and affixed at one end to an upper mid-section of said first lateral surface of said s-shaped hook and at another end to said top surface of said upper bar of said first frame member forming junctions at both ends; and
wherein said upper mid-section of said s-shaped hook defines a central axis extending through said first frame member and said second frame member with a first half of said first and second frame members on a first side of said central axis and a second half of said first and second frame members on a second side of said central axis.

15. The apparatus of claim 14, further comprising a lateral brace flanking and extending from a second lateral surface of said s-shaped hook: wherein said first and second lateral surfaces of said s-shaped hook are diametrically opposed surfaces; and wherein said lateral brace is attached to a lower mid-section of said s-shaped hook and said upper bar of the first frame member forming junctions at each point of attachment.

16. The apparatus of claim 15 wherein said first frame member, said second frame member, said lateral hand grip, and said lateral brace are aligned and co-planar, and wherein said lateral brace and said lateral hand grip are positioned above the first frame member, and said first frame member is positioned above the second frame member.

17. The apparatus of claim 15 wherein said first frame member, said second frame member, said lateral hand grip, said lateral brace, said s-shaped hook, and said plurality of prong units are single piece stainless steel rods.

18. An apparatus for supporting cuts of meat during processing comprising:
a frame comprising
a first frame member comprising a one-piece substantially rectangular support comprising an upper bar, a lower bar, a first side bar, and a second side bar, wherein said upper bar and said lower bar are parallel and said first side bar and said second side bar are parallel; and
a second frame member comprising a u-shaped support comprising a lower bar, a first side bar, a second side bar, wherein said first side bar and said second side bar of the u-shaped support bend substantially 90 degrees outward to form a first side bar extension at a first end of the u-shaped support and a second side bar extension at a second end of the u-shaped support, each side bar extension extending in opposite directions and each positioned parallel to and beneath a bottom surface of said lower bar of said first frame member,
wherein said substantially rectangular support is positioned above and vertically co-planar with said u-shaped support:
wherein a top surface of said first and second side bar extensions are affixed to said bottom surface of said lower bar of the first frame member forming a plurality of junctions securing said second frame member to said first frame member,
and
a plurality of prong units, each prong unit comprising at least one arm the entirety of which extends outward and at an acute angle to the vertical plane of said substantially rectangular support and said u-shaped support comprising a terminal point, and a support bar,
wherein a first set of prong units comprises a first double prong unit, a second double prong unit, a first single prong unit, and a second single prong unit affixed to said lower bar of the first frame member and a second set of prong units comprises a first double prong unit and a second double prong unit affixed to said lower bar of the second frame member.

19. The apparatus of claim 18, further comprising a transverse brace formed from said support bars of said first and second single prong units.

20. The apparatus of claim 19, wherein said transverse brace comprises two diagonal supports extending from said support bars of said first and second single prong units to a bottom surface of the upper bar of the first frame member at an angle defined by said lower bar of said first frame member and said diagonal support.

21. The apparatus of claim 20, wherein said transverse brace comprises a bridge connecting said two diagonal supports positioned parallel to and beneath said bottom surface of said upper bar of the first frame member.

22. The apparatus of claim 20, wherein said angle is 45 degrees.

* * * * *